United States Patent
Gadelrab et al.

(10) Patent No.: US 12,182,676 B2
(45) Date of Patent: *Dec. 31, 2024

(54) CONCURRENT OPTIMIZATION OF MACHINE LEARNING MODEL PERFORMANCE

(71) Applicant: QUALCOMM Incorporated, San Diego, CA (US)

(72) Inventors: Serag Gadelrab, Markham (CA); James Esliger, Tillsonburg (CA); Meghal Varia, North York (CA); Kyle Ernewein, Toronto (CA); Alwyn Dos Remedios, Maple (CA); George Lee, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,022

(22) Filed: Dec. 13, 2023

(65) Prior Publication Data

US 2024/0112090 A1 Apr. 4, 2024

Related U.S. Application Data

(63) Continuation of application No. 16/515,711, filed on Jul. 18, 2019, now Pat. No. 11,907,810.

(51) Int. Cl.
| | | |
|---|---|---|
| *G06N 20/00* | (2019.01) | |
| *G06F 11/34* | (2006.01) | |
| *G06N 5/04* | (2023.01) | |

(52) U.S. Cl.
CPC ......... *G06N 20/00* (2019.01); *G06F 11/3466* (2013.01); *G06N 5/04* (2013.01)

(58) Field of Classification Search
CPC ....... G06N 20/00; G06N 5/04; G06F 11/3466
See application file for complete search history.

(56) References Cited

U.S. PATENT DOCUMENTS

| | | |
|---|---|---|
| 2019/0050749 A1 | 2/2019 | Sanketi et al. |
| 2019/0156247 A1 | 5/2019 | Faulhaber, Jr. et al. |

(Continued)

OTHER PUBLICATIONS

Chen T., et al., "TVM: An Automated End-to-End Optimizing Compiler for Deep Learning", arXiv: 1802.04799v3 [cs.LG], Oct. 5, 2018, Cornell University Library, 201 Olin Library Cornell University Ithaca, NY 14853, Feb. 12, 2018, pp. 1-16. XP081420453, abstract Chapter 3: Optimizing computational graphs, pp. 3-4 Chapter 5: Automating optimization, pp. 8-10 Chapter 4.1 Tensor expression and schedule space, pp. 4-5.

*Primary Examiner* — Hope C Sheffield
(74) *Attorney, Agent, or Firm* — QUALCOMM Incorporated

(57) ABSTRACT

Certain aspects of the present disclosure provide techniques for concurrently performing inferences using a machine learning model and optimizing parameters used in executing the machine learning model. An example method generally includes receiving a request to perform inferences on a data set using the machine learning model and performance metric targets for performance of the inferences. At least a first inference is performed on the data set using the machine learning model to meet a latency specified for generation of the first inference from receipt of the request. While performing the at least the first inference, operational parameters resulting in inference performance approaching the performance metric targets are identified based on the machine learning model and operational properties of the computing device. The identified operational parameters are applied to performance of subsequent inferences using the machine learning model.

20 Claims, 11 Drawing Sheets

(56) References Cited

U.S. PATENT DOCUMENTS

| | | |
|---|---|---|
| 2019/0295252 A1 | 9/2019 | Fuchs et al. |
| 2019/0311374 A1 | 10/2019 | Dai et al. |
| 2020/0285642 A1 | 9/2020 | Bei et al. |
| 2021/0019652 A1 | 1/2021 | Gadelrab |

CONCURRENT OPTIMIZATION OF MACHINE LEARNING MODEL PERFORMANCE

CROSS-REFERENCE TO RELATED APPLICATIONS

This application is a continuation of U.S. patent application Ser. No. 16/515,711, entitled "Concurrent Optimization of Machine Learning Model Performance," filed Jul. 18, 2019, and assigned to the assignee hereof, the entire contents of which are hereby incorporated by reference.

INTRODUCTION

Aspects of the present disclosure relate to optimizing machine learning model performance.

Machine learning generally produces a trained model (e.g., an artificial neural network, a tree, or other structures), which represents a generalize fit to a set of training data that is known a priori. Applying the trained model to new data produces inferences, which may be used to gain insight into the new data. In some cases, applying the model to the new data is described as "running an inference" on the new data.

Predefined operational parameters may be used to tune the performance of a machine learning model performing inferences. These precomputed operational parameters may result in optimization of key performance indicators (KPIs) for well-known networks, but may not optimize inference performance for new types of networks, different hardware platforms, and the like. Further, applications may define a maximum latency between receipt of a request to perform inferences on a data set and the generation of an initial inference for the data set, which may cause systems to select predefined operational parameters for the machine learning model used to perform inferences, which, as discussed above, may not optimize inference performance. Accordingly, what are needed are systems and methods for generating inference results to meet latency requirements for an application while improving trained model performance so that KPIs can be improved.

BRIEF SUMMARY

Embodiments of the present disclosure provide a method for performing inferences using a machine learning model on a computing device. The method generally includes receiving a request to perform inferences on a data set using the machine learning model and performance metric targets for performance of the inferences. At least a first inference on the data set is performed using the machine learning model to meet a latency specified for generation of the first inference from receipt of the request. While performing the at least the first inference, operational parameters resulting in inference performance approaching the performance metric targets are identified based on the machine learning model and operational properties of the computing device. The identified operational parameters are applied to performance of subsequent inferences using the machine learning model.

Further embodiments of the present disclosure provide a system having a processor and a memory. The memory generally includes instructions stored thereon which, when executed by the processor, performs an operation for performing inferences using a machine learning model on a computing device. The operation generally includes receiving a request to perform inferences on a data set using the machine learning model and performance metric targets for performance of the inferences. At least a first inference on the data set is performed using the machine learning model to meet a latency specified for generation of the first inference from receipt of the request. While performing the at least the first inference, operational parameters resulting in inference performance approaching the performance metric targets are identified based on the machine learning model and operational properties of the computing device. The identified operational parameters are applied to performance of subsequent inferences using the machine learning model.

Still further embodiments of the present disclosure provide a computer-readable medium having instructions stored thereon which, when executed by a processor, performs an operation for performing inferences using a machine learning model on a computing device. The operation generally includes receiving a request to perform inferences on a data set using the machine learning model and performance metric targets for performance of the inferences. At least a first inference on the data set is performed using the machine learning model to meet a latency specified for generation of the first inference from receipt of the request. While performing the at least the first inference, operational parameters resulting in inference performance approaching the performance metric targets are identified based on the machine learning model and operational properties of the computing device. The identified operational parameters are applied to performance of subsequent inferences using the machine learning model.

Further embodiments relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
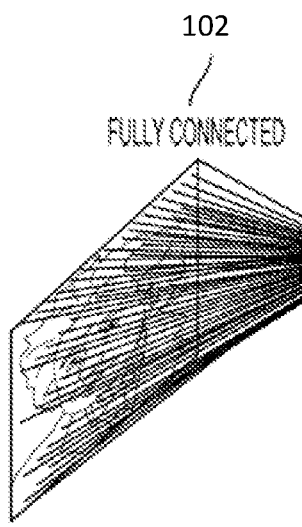
FIGS. 1A, 1B, 1C, and 1D depict examples of various types of neural networks.

Aspects of the present disclosure provide apparatuses, methods, processing systems, and computer readable mediums for optimizing the performance of machine learning models, such as neural networks, in hardware.

Deep Neural Networks and Deep Learning

Deep learning architectures may perform complex tasks, such as object recognition, by learning to represent inputs at successively higher levels of abstraction in each layer, thereby building up a useful feature representation of the input data. In this way, deep learning addresses a major bottleneck of traditional machine learning.

Prior to the advent of deep learning, a machine learning approach for a task may have relied heavily on human engineered features, perhaps in combination with a shallow classifier. A shallow classifier may be a two-class linear classifier, for example, in which a weighted sum of input values (e.g., input vector components) may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

In some implementations, a deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. Further layers may learn to represent complex shapes in visual data or words in auditory data. Still further layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. For example, in feed-forward networks, information is passed from lower to higher layers, with each neuron in a given layer communicating to neurons in higher layers. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 1A illustrates an example of a fully connected neural network 102. In a fully connected neural network 102, a neuron in a first layer may communicate its output to every neuron in a second layer, so that each neuron in the second layer will receive input from every neuron in the first layer.

Figure 1B:
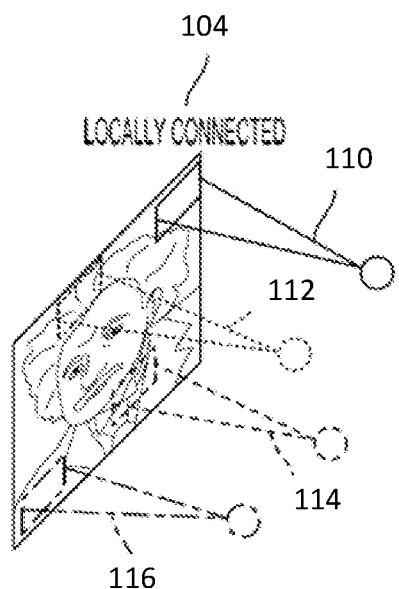

FIG. 1B illustrates an example of a locally connected neural network 104. In a locally connected neural network 104, a neuron in a first layer may be connected to a limited number of neurons in the second layer. More generally, a locally connected layer of the locally connected neural network 104 may be configured so that each neuron in a layer will have the same or a similar connectivity pattern, but with connections strengths that may have different values (e.g., 110, 112, 114, and 116). The locally connected connectivity pattern may give rise to spatially distinct receptive fields in a higher layer, because the higher layer neurons in a given region may receive inputs that are tuned through training to the properties of a restricted portion of the total input to the network.

Figure 1C:
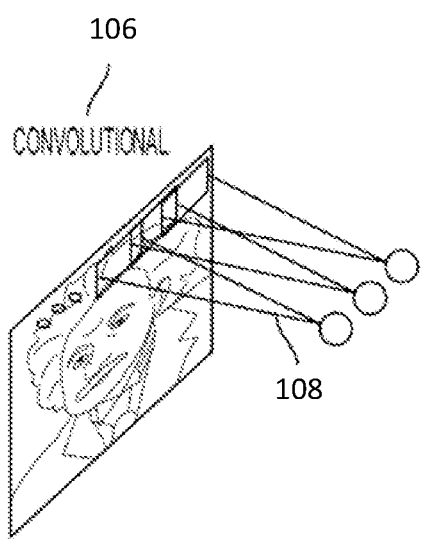

One example of a locally connected neural network is a convolutional neural network. FIG. 1C illustrates an example of a convolutional neural network 106. The convolutional neural network 106 may be configured such that the connection strengths associated with the inputs for each neuron in the second layer are shared (e.g., 108). Convolutional neural networks may be well suited to problems in which the spatial location of inputs is meaningful.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a nonlinearity, such as a rectification, max(0,x). Values from adjacent neurons may be further pooled, which corresponds to down sampling, and may provide additional local invariance and dimensionality reduction.

One type of convolutional neural network is a deep convolutional network (DCN). Deep convolutional networks (DCNs) are networks of convolutional layers, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

Figure 1D:
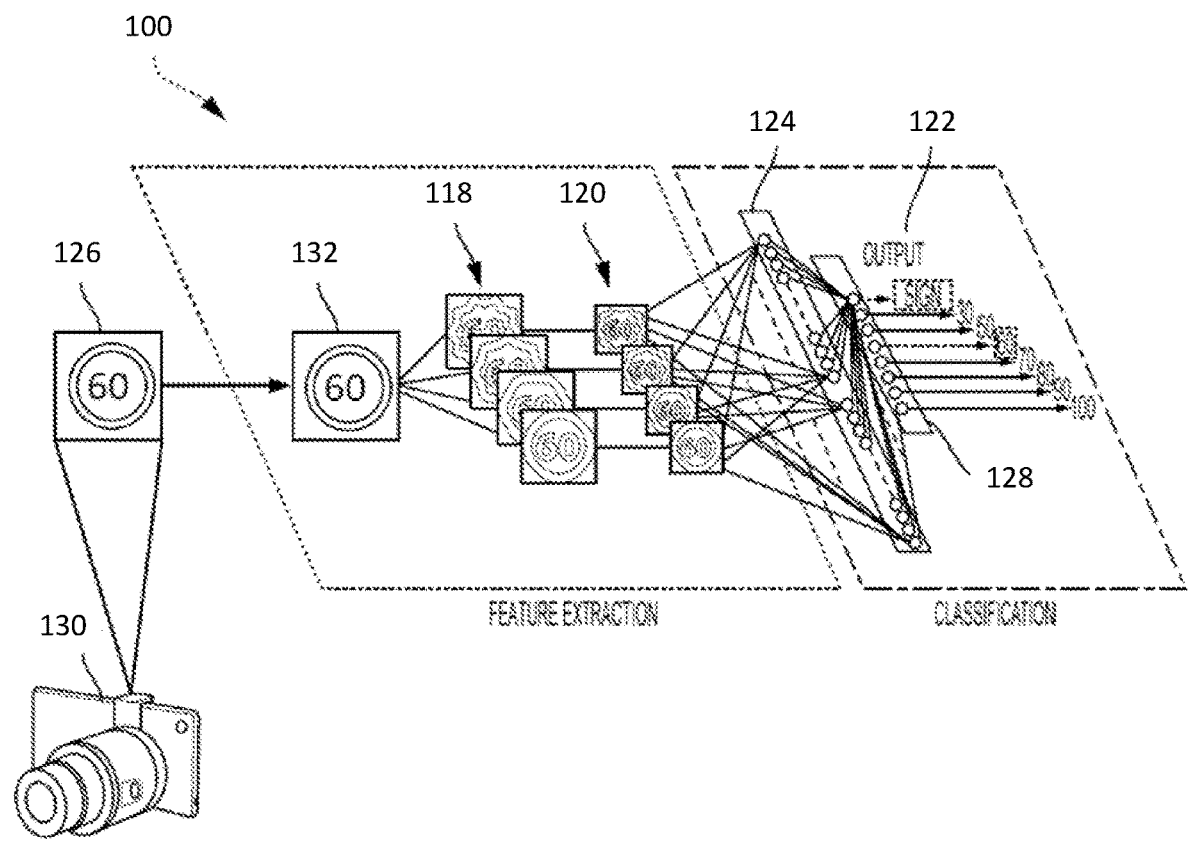

FIG. 1D illustrates a detailed example of a DCN 100 designed to recognize visual features from an image 126 input from an image capturing device 130, such as a car-mounted camera. The DCN 100 of the current example may be trained to identify traffic signs and a number provided on the traffic sign. Of course, the DCN 100 may be trained for other tasks, such as identifying lane markings or identifying traffic lights. These are just some example tasks, and many others are possible.

DCN 100 may be trained with supervised learning. During training, the DCN 100 may be presented with an image, such as the image 126 of a speed limit sign, and a forward pass may then be computed to produce an output 122. DCN 100 may include a feature extraction section and a classification section. Upon receiving the image 126, a convolutional layer 132 may apply convolutional kernels (not shown) to the image 126 to generate a first set of feature maps 118. As an example, the convolutional kernel for the convolutional layer 132 may be a 5×5 kernel that generates 28×28 feature maps. In the present example, because four different feature maps are generated in the first set of feature maps 118, four different convolutional kernels were applied to the image 126 at the convolutional layer 132. The convolutional kernels may also be referred to as filters or convolutional filters.

The first set of feature maps 118 may be subsampled by a max pooling layer (not shown) to generate a second set of feature maps 120. The max pooling layer reduces the size of the first set of feature maps 118. That is, a size of the second set of feature maps 120, such as 14×14, is less than the size of the first set of feature maps 118, such as 28×28. The reduced size provides similar information to a subsequent layer while reducing memory consumption. The second set of feature maps 120 may be further convolved via one or more subsequent convolutional layers (not shown) to generate one or more subsequent sets of feature maps (not shown).

In the example of FIG. 1D, the second set of feature maps 120 is convolved to generate a first feature vector 124. Furthermore, the first feature vector 124 is further convolved to generate a second feature vector 128. Each feature of the second feature vector 128 may include a number that corresponds to a possible feature of the image 126, such as "sign," "60," and "100." A softmax function (not shown) may convert the numbers in the second feature vector 228 to a probability. As such, an output 122 of the DCN 100 is a probability of the image 126 including one or more features.

In the present example, the probabilities in the output 122 for "sign" and "60" are higher than the probabilities of the others of the output 122, such as "30," "40," "50," "70," "80," "90," and "100". Before training, the output 122 produced by DCN 100 is likely to be incorrect. Thus, an error may be calculated between the output 122 and a target output. The target output is the ground truth of the image 126 (e.g., "sign" and "60"). The weights of DCN 100 may then be adjusted so the output 122 of DCN 100 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, DCN 100 may be presented with new images and a forward pass through the network may yield an output 122 that may be considered an inference or a prediction of the DCN.

Finally, deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Figure 2:
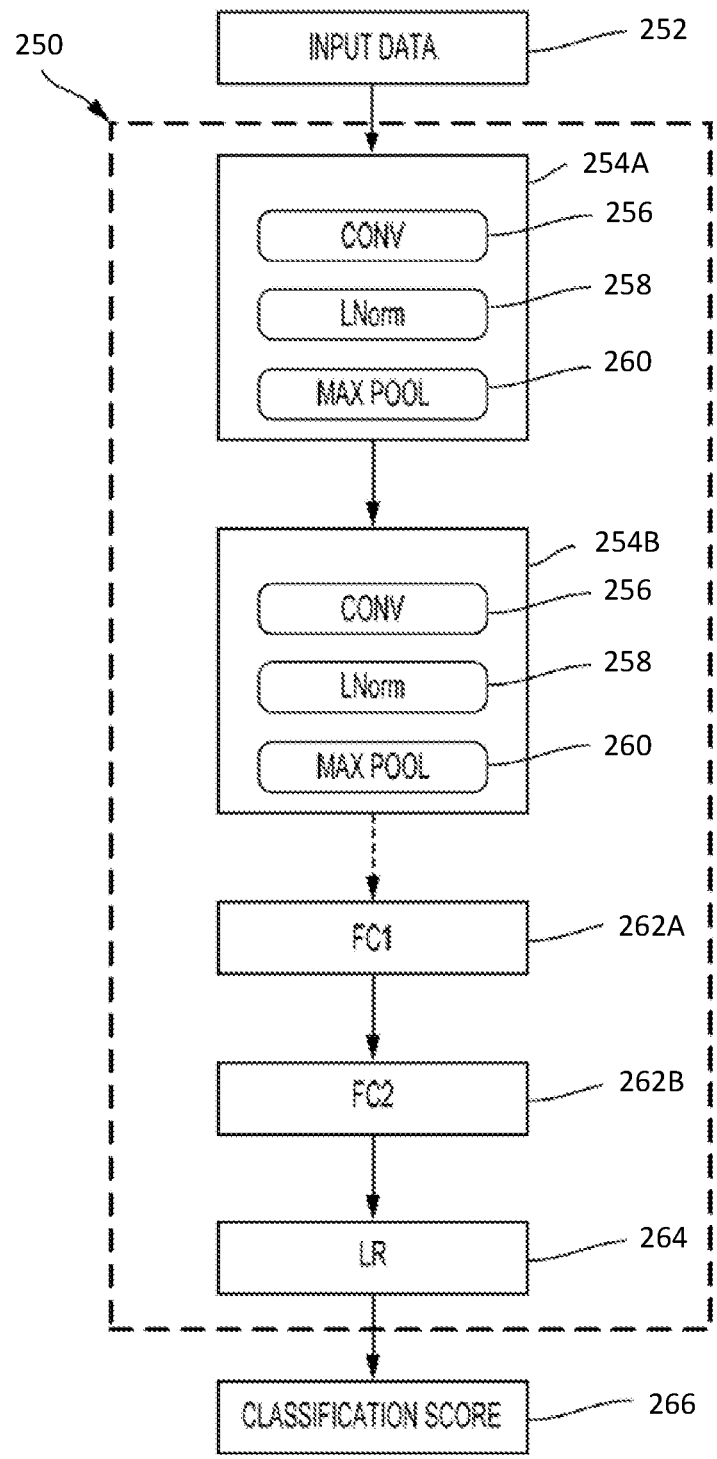
FIG. 2 is a block diagram illustrating an exemplary deep convolutional network.

FIG. 2 is a block diagram illustrating an exemplary deep convolutional network 250. The deep convolutional network 250 may include multiple different types of layers based on connectivity and weight sharing. As shown in FIG. 2, the deep convolutional network 250 includes the convolution blocks 254A and 254B. Each of the convolution blocks 254A and 254B may be configured with a convolution layer (CONV) 256, a normalization layer (LNorm) 258, and a max pooling layer (MAX POOL) 260.

The convolution layers 256 may include one or more convolutional filters, which may be applied to the input data 252 to generate a feature map. Although only two convolution blocks 254A and 254B are shown, the present disclosure is not so limiting, and instead, any number of convolution blocks (e.g., blocks 254A and 254B) may be included in the deep convolutional network 250 according to design preference. The normalization layer 258 may normalize the output of the convolution filters. For example, the normalization layer 258 may provide whitening or lateral inhibition. The max pooling layer 260 may provide down sampling aggregation over space for local invariance and dimensionality reduction.

The parallel filter banks, for example, of a deep convolutional network may be loaded onto one or more processors of a processing device, such as described below with respect to FIG. 10, to achieve high performance and low power consumption.

The deep convolutional network 250 may also include one or more fully connected layers, such as layer 262A (labeled "FC1") and layer 262B (labeled "FC2"). The deep convolutional network 250 may further include a logistic regression (LR) layer 264. Between each layer 256, 258, 260, 262, 264 of the deep convolutional network 250 are weights (not shown) that are to be updated. The output of each of the layers (e.g., 256, 258, 260, 262, and 264) may serve as an input of a succeeding one of the layers (e.g., 256, 258, 260, 262, and 264) in the deep convolutional network 250 to learn hierarchical feature representations from input data 252 (e.g., images, audio, video, sensor data, and/or other input data) supplied at the first of the convolution blocks 254A. The output of the deep convolutional network 250 is a classification score 266 for the input data 252. The classification score 266 may be a set of probabilities, where each probability is the probability of the input data including a feature from a set of features.

Model Inference Performance Strategies

Many types of computational hardware blocks may be used to run an inference, including, for example: a central processing unit (CPU), a graphics processing unit (GPU), a digital signal processor (DSP), a neural processing unit (NPU), a field programmable gate array (FPGA), an application specific integrated circuit (ASIC), and other custom hardware.

Key performance indicators (KPIs) may quantify the performance of a trained model, such as the "quality" and "efficiency" of an inference from a trained model. For example, accuracy of the inference, speed of the inference, size of the inference, power consumed by a device performing an inference, hardware utilization and bandwidth by a device performing an inference, and others are examples of KPIs. Generally, optimization of one KPI comes at the expense of one or more other KPIs.

Generally, machine learning models are executed to meet one or more target KPIs. These targets may be based on the task to be performed using the machine learning models, the hardware components on which these machine learning models are executed, and the like. For any given inference, a target cost function may exist defining the one or more target KPIs defined for a given application.

Machine learning models, such as those just described, may be statically optimized using various techniques. In some cases, heuristics may be used to determine optimizations to apply to execution of a machine learning model. These heuristics may examine parameters of a machine learning model, such as a number of fully connected layers included in a model, the size of a data set processed by the machine learning model to generate an inference, and the like. Optimizations that have been previously seen to work on machine learning models with similar parameters may be applied to a machine learning model being optimized. Because using heuristics to optimize performance of a machine learning model may be computationally inexpensive, machine learning models may be optimized quickly. However, other optimizations may result in better performance (e.g., may result in KPIs closer to target KPIs established for an application of the machine learning model) than an optimization for the machine learning model selected using heuristics.

Another static optimization may use off-line optimization of parameters on a per-model basis. If the structure of a machine learning model is well-known, optimizations may be performed before the machine learning model is requested to perform an inference, and the result of the optimization may be stored on a device executing the machine learning model or a remote device. When an inference using the machine learning model is requested, the optimized parameters for the machine learning model may be retrieved and applied to the machine learning model. However, off-line optimization of machine learning model parameters may optimize a machine learning model for a target hardware platform (e.g., target central processing unit/graphics processing unit or system-on-chip) when the model and target hardware platform are known a priori and may not optimize models that are provided on a just-in-time basis for a given inference on hardware platforms that are different from the target hardware platform.

Still further static optimizations may use machine learning-based optimization models that use off-line optimizations of similar models on various hardware platforms to generate optimized parameters for a machine learning model. While machine learning-based optimization models may optimize for a wide variety of machine learning models and hardware platforms, these techniques may generate optimizations for specific scenarios that were used to train the machine learning-based optimization models rather than optimizations that are tailored for specific computing devices and operational properties of the computing devices on which a machine learning model is to be executed. Further, these models may generate optimizations that are invalid for a given system (e.g., optimizations that assume the presence of computing resources that are unavailable on the system). To avoid the application of invalid parameters to a machine learning model, other static optimizations may be used as a fallback option.

To optimize inference operations performed using a machine learning model while generating an initial inference from a data set within a short amount of time of receiving a request to generate inferences, embodiments described herein provide techniques for concurrently executing inferences and optimizing the operational parameters used by machine learning models to execute inferences. The optimizations may be based, at least in part, on the information about the structure of the machine learning model (e.g., the type of neural network defined for the machine learning model, a number of layers in the machine learning network, size of layers, inter-layer and intra-layer connectivity etc.) and system conditions. An optimizer can periodically attempt to identify further optimized parameters for executing inferences using a machine learning model on a given hardware platform to achieve KPIs closer to target KPIs defined for an application and, when further optimized parameters are identified, the further optimized parameter may be used for subsequent inferences performed by the machine learning model. Further, the optimizer can monitor system and input conditions to update an optimization dynamically as the system or input conditions change. For example, optimizations may be re-generated in response to changes in computing capabilities at a device (e.g., due to processor throttling or other power reduction schemes used when a device is disconnected from mains power and, correspondingly processor frequency ramping or other performance schemes used when a device is connected to mains power, thermal throttling, etc.), reductions in available memory, and the like.

Example Concurrent Inference and Machine Learning Model Performance Optimization To satisfy latency requirements defining a time at which a first inference is to be returned in response to perform inferences on a data set and optimize performance of the machine learning model, embodiments described herein provide various techniques for generating initial inferences using an initial optimization for the machine learning model and generating subsequent optimizations for the machine learning model based on the structure of the machine learning model (e.g., a number of neural network layers, connections between neural network layers, expected input data set size, etc.) and system conditions. Over time, KPIs for the machine learning model may approach, meet, or exceed target KPIs defined for an application through continual optimization of the operational parameters used to execute inferences using a machine learning model. By utilizing an initial optimization for an initial inference and continually optimizing the performance of the machine learning model, embodiments described herein may allow for the generation of inferences that comply with a maximum latency defined for an application while continually optimizing parameters of a machine learning model to achieve target KPIs and account for changes in execution conditions on a computing system.

Figure 3:
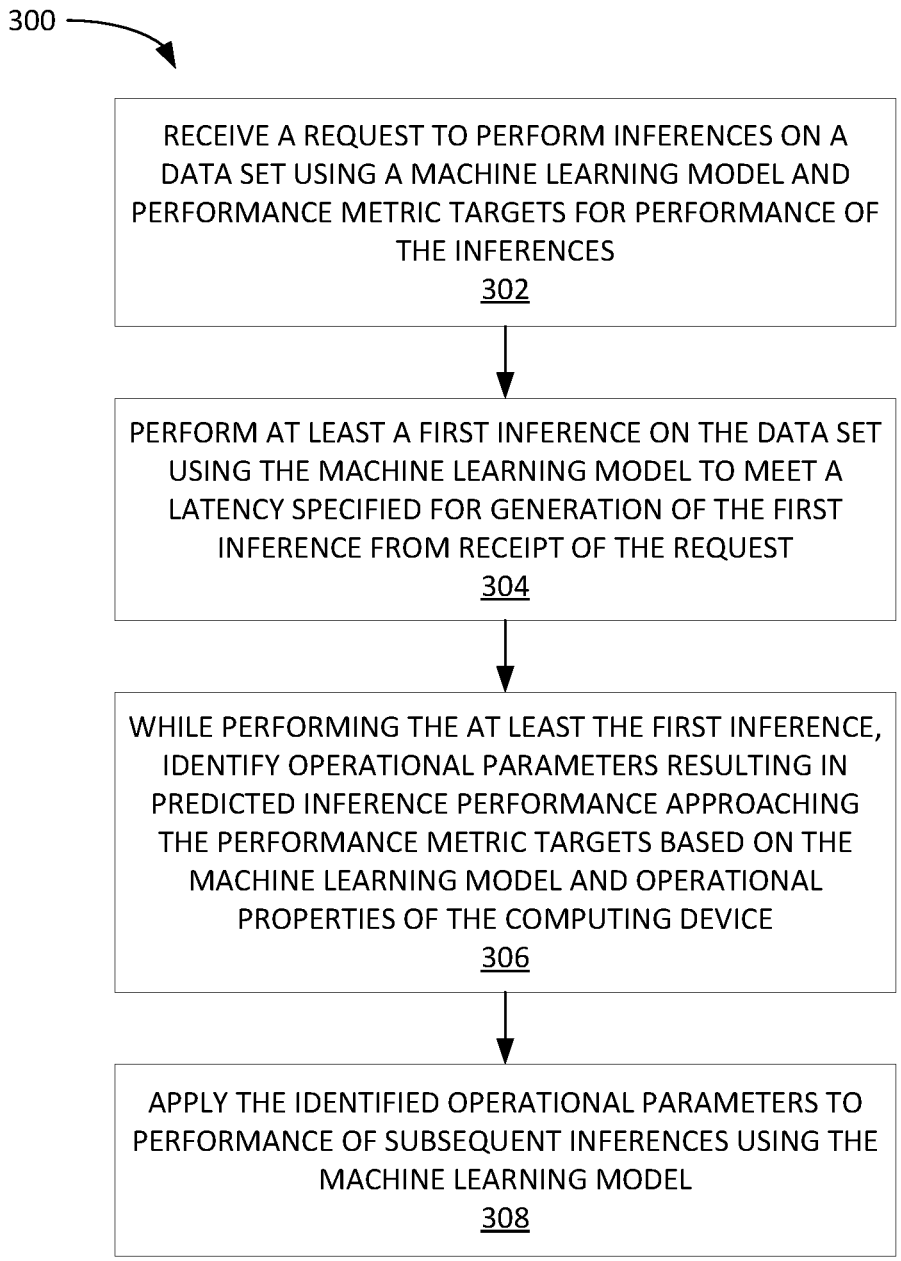
FIG. 3 illustrates example operations for performing inferences using a trained machine learning model and optimizing operational parameters used for execution of the trained machine learning model, according to embodiments described herein.

FIG. 3 illustrates example operations 300 for concurrently performing inferences using a machine learning model and optimizing operational parameters applied to the machine learning model, according to embodiments described herein. Operations 300 may be performed by a computing device with one or more processors (e.g., CPU, DSP, GPU, etc.) implementing a machine learning model, such as described with respect to FIG. 10, below.

As illustrated, operations 300 begin at block 302, where the computing device receives a request to perform inferences on a data set using the machine learning model and performance metric targets for performance of the inferences.

The performance metric targets may define, for example, an accuracy of inferences performed using the machine learning model, an execution time for performance of an inference, an amount of power consumed to perform an inference, an amount of memory consumed to perform an inference, an amount of data transferred during performance of an inference, and other metrics.

At block 304, the computing device performs at least a first inference on the data set using the machine learning model to meet a latency specified for generation of the first inference from receipt of the request. To achieve low latency, the computing device may execute a first inference shortly after receiving the request to perform inferences on the data set.

In some embodiments, the specified latency may be compared with a total amount of time needed to generate an initial optimization of parameters for the machine learning model and generate the first inference using the initial optimization of parameters. If the total amount of time needed to generate the initial optimization and generate the first inference using the initial optimization allows for generation of the first inference within the specified latency, the computing device can generate an initial optimization and use the initial optimization to generate the first inference. Otherwise, the computing device can perform at least the first inference on the data set using a predefined optimization for the machine learning model (e.g., an optimization generated using heuristics, as discussed above).

At block 306, while performing at least the first inference, the computing device identifies operational parameters resulting in projected inference performance approaching the performance metric targets (or optimized parameters) while performing at least the first inference. The operational parameters may be generated based on the machine learning model and operational properties of the computing device.

In some embodiments, to identify operational parameters while performing at least the first inference, the computing device can execute the machine learning model on a first processing core or set of computing resources and identify the operational parameters resulting in inference performance approaching, meeting, or exceeding the performance metric targets on a second processing core or set of computing resources.

In some embodiments, the computing device can time-multiplex inference operations and optimization of operational parameters for the machine learning model to allow for inference and model optimization to execute simultaneously or substantially simultaneously. Generally, time-multiplexing inference operations and optimization of operational parameters for the machine learning model may allow for these operations to be performed substantially simultaneously on a limited set of hardware (e.g., a single processing core) by periodically switching between executing inference and operational parameter optimization operations.

In some embodiments, identification of optimized parameters (e.g., operational parameters having inference performance approaching, meeting, or exceeding the performance metric targets) may be offloaded from the computing device to a remote computing device (e.g., a server, computing resources executing in a cloud environment, etc.) on which an optimizer model executes. In such cases, the computing device may continue to perform inferences on the received data set while optimization operations are performed on a different computing system.

At block 308, the system applies the identified operational parameters to performance of subsequent inferences using the machine learning model. Generally, performing the subsequent inferences using the identified operational parameters may improve the performance of the subsequent inferences. Performance metrics measured for the subsequent inferences may approach, meet, or exceed the target performance indicators for the inferences.

In some embodiments, an optimizer model used to identify optimized operational parameters may account for dynamic performance conditions at the computing device. To account for dynamic performance conditions at the computing device, execution of the optimizer model may be paused while sampling the performance conditions at the computing device. By pausing execution of the optimizer model, performance effects on the computing device caused by the optimizer model may be excluded from consideration in optimizing the operational parameters for inference operations using the machine learning model.

In some embodiments, optimization of the operational parameters may be performed continually until no further optimizations for the machine learning model can be identified. The computing device, however, may continue to monitor system and input conditions to update the optimized operational parameters as system and/or input conditions change.

For example, due to thermal throttling (where processor heat output causes the computing device to reduce the speed of one or more processors on the computing device) or current draw throttling (where an amount of power drawn by one or more processors on the computing device is reduced to reduce power draw from a battery), performance characteristics of the computing device may change. As performance characteristics of the computing device change, new performance metric targets may be established for execution of the machine learning model on the computing device, and operational parameters may be optimized by executing the optimizer model based on the characteristics of the machine learning model and the current performance characteristics of the computing device.

In some embodiments, to manage the frequency at which operational parameters are re-optimized in response to changes in performance characteristics of the computing device, hysteresis may applied to a re-optimization decision heuristic to prevent unnecessary optimizations when conditions and performance vary within expected margins. For example, the changes in performance characteristics of the computing device may change by a threshold amount or change to a different set of performance characteristics for a threshold amount of time before the operational parameters are re-optimized to account for these changes.

In some embodiments, the optimizer model may apply different optimizations, and identification of optimized parameters may be performed using multiple optimizers targeting different performance metrics.

In some embodiments, the optimizations may affect various parameters defining how the machine learning model performs an inference. For example, some optimizations may include tiling, which may increase data locality and compute efficiency and decrease memory bandwidth needs (e.g., for swapping data in and out of memory) and overall power consumption of the computing device. As another example, layers in a machine learning model may be fused, which may reduce computational expense, power usage, and memory bandwidth. As yet another example, constant propagation may also be used to reduce computational expense and memory bandwidth. Further optimizations may include pruning or zeroing weights or using K-clustering for weights. In some embodiments, optimizations may trade off inference accuracy for reduced computational expense, power usage, and memory bandwidth usage depending on device conditions and inference request parameters, to name a few examples.

Operational properties of the computing device that may be considered in optimizing the operational parameters of the machine learning model may include, for example, system parameters and system conditions. System parameters may include, for example, processor speed, power, thread count, the availability of specialized hardware or instruction support in a processor (e.g., vector processing extensions), memory bandwidth, hardware interconnect bandwidth, power constraints on the processor, and the like. System conditions may include memory latency, cache eviction statistics (e.g., how often data is moved from a cache local to a processor to memory external to the processor), inference completion time, compression ratio for activation or weight data, and the like.

In some embodiments, an optimizer model used to identify operational parameters may be downloaded to a computing device running the machine learning model periodically from a remote source or may be pushed to the computing device on which the optimizer model executes from the remote source.

In some embodiments, the optimized parameters generated by an optimizer model and the associated operational characteristics of the computing device may be recorded (e.g., on local storage or in a remote storage system) and recalled for future execution of the same machine learning model when the computing device is operating under the same or similar operational characteristics. The optimized parameters and associated operational characteristics of the computing device may also be provided to a user or application requesting an inference, and the user or application can provide the optimized parameters back to the computing device for use in subsequent inferences.

In some embodiments, optimized parameters generated by optimizer models executing on various devices may be aggregated into a global training data set of optimized parameters, computing device properties and machine learning model structure mapped to recorded inference performance. The global training data set may be used to incrementally re-train the optimizer model in a federated learning approach in which multiple computing devices collaboratively learn (and re-learn) the optimizer model used to generate optimized parameters for generation of inferences using machine learning models.

In some embodiments, a historical set of results for performance metrics may be saved (e.g., in a look-up table) for future retrieval outside of execution of the optimizer model. These results may be deprioritized from future search paths to accelerate a search for optimized parameters in future inferences by not repeating searches that were previously computed.

Figure 4:
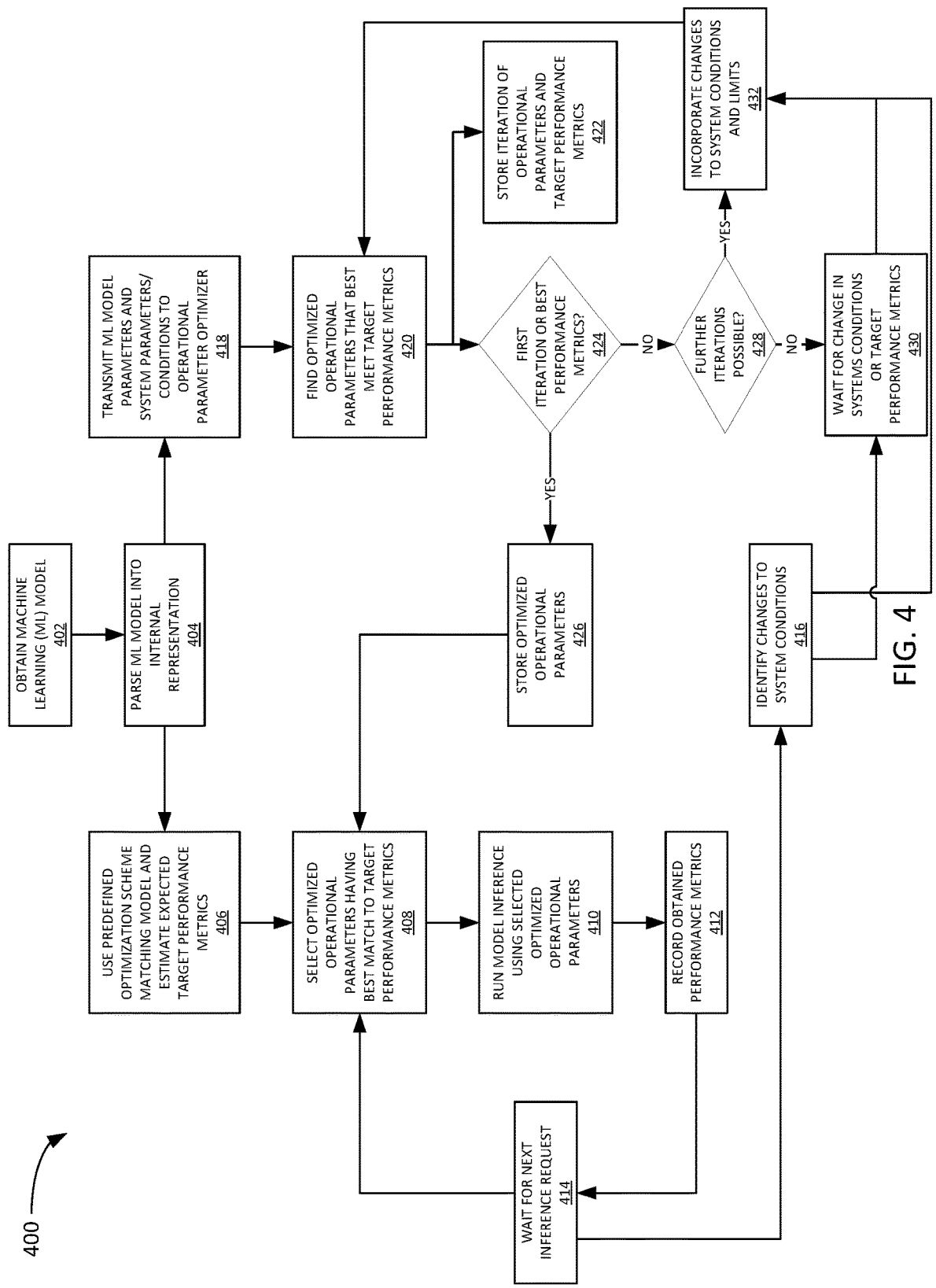
FIG. 4 illustrates a flow chart for concurrent inference and model optimization, according to embodiments described herein.

FIG. 4 illustrates a flow chart showing operations performed for concurrent inference and model optimization, according to embodiments described herein. As illustrated, concurrent inference and model optimization may begin at block 402, where a machine learning model is obtained. At block 404, the machine learning model is parsed into an internal representation. The internal representation generally identifies various properties of the machine learning model, such as model parameters, a number of neural network layers, layer size, layer connectivity, and the like.

At block 406, a system uses a predefined optimization scheme associated with the model to estimate expected target performance metrics. At block 408, the system selects optimized operational parameters having a best match to the target performance metrics. In some embodiments, as discussed above, the optimized operational parameters selected initially may be parameters generated from a static, heuristic optimization of the machine learning model based, for example, on the internal representation of the machine learning model. Subsequently, as the system optimizes operational parameters for the machine learning model (which, as discussed, may occur concurrently or substantially concurrently with execution of inference operations using the machine learning model), inferences may be performed using the optimized operational parameters, which may be operational parameters resulting in measured performance metrics for inference operations approaching target performance metrics.

At block 410, the system runs a model inference using the selected optimized operational parameters. Generally, prior to the use and generation of dynamically optimized parameters (as discussed in further detail below), the system uses statically optimized parameters to run the model inference.

At block 412, performance metrics are obtained, and at 414, the system waits for the next inference request.

When the next inference request is received, operations return to block 408, where the system selects optimized operational parameters to use for execution of inference operations using the machine learning model. Generally, the selection of optimized operational parameters may be performed to determine whether a previously-used set of operational parameters (e.g., the statically optimized operational parameters used prior to use of any dynamically optimized operational parameters, or a previous dynamically generated set of optimized operational parameters) represents the latest set of optimized parameters for use in executing the model inference. If an optimizer model has generated new dynamically optimized parameters, which, as discussed above, may achieve increased performance relative to a previous set of optimized parameters used for model inference, the system can determine that the new optimized parameters are to be used in performing an inference for the received inference request. Additionally, while waiting for the next inference request, at block 416, the system identifies changes to system conditions and incorporates the identified changes to system conditions into parameters used by a model optimizer to identify optimal operational parameters for the machine learning model at block 432. These changes may include, for example, changes in memory latency, power utilization, thermal limits, and the like.

Concurrently, while inference operations are executed in block 408 through 414, the system additionally optimizes operational parameters for performing inferences using the machine learning model. At block 418, the machine learning model parameters and system parameters and conditions may be transmitted to an operational parameter optimizer 418. The operational parameter optimizer may be a machine learning model that has been trained using a training data set of operational parameters and system parameters and conditions mapped to the resulting performance metrics for inference operations performed according to the operational parameters on a computing system having the system parameters and conditions.

At block 420, the system finds operational parameters that best meet the target performance metrics. The system can find these operational parameters by calculating the expected performance metrics for each set of operational parameters recommended by the operational parameter optimizer. For example, where a single performance metric is targeted for optimization, the operational parameter optimizer can find the operational parameters that result in the closest match to the single performance metric. Where multiple performance metrics are optimized, the operational parameter optimizer can find the operational parameters that result in the closest match to the multiple performance metrics, weighted according to a predefined importance for each of the individual performance metrics that are optimized.

At block 422, the system stores the iteration of the operational parameters and target performance metrics in a training data set. As discussed in further detail below with respect to FIG. 8, measured performance metrics may further be stored in the training data set for the iteration of the operational parameters and target performance metrics to retrain the operational performance optimizer. Meanwhile, at block 424, the system determines whether the optimized operational parameters result from a first iteration of the operational parameter optimizer or results in the best performance for any given iteration of operational parameter optimization. If the optimized operational parameters result from the first iteration of the operational parameter optimizer or results in the best performance for any given iteration of operational parameter optimization, then at block 426, the optimized operational parameters are stored for retrieval and use by an inference process using the machine learning model.

Otherwise, if the optimized operational parameters do not result in the best performance metrics for a given iteration of parameter optimization, at block 428, the system determines whether further iterations are possible. If so, at block 432, changes to system conditions and performance limits for the machine learning model may be incorporated into system parameters provided to the operational parameter optimizer as input to generate a recommended set of operational parameters for the machine learning model, and operational parameter optimization may return to block 420 for another attempt to further optimize the operational parameters used for executing inference operations using the machine learning model. Otherwise, at block 430, the system waits to detect a change in system conditions or target performance metrics before incorporating those changes into system parameters used as input into an operational parameter optimizer.

Figure 5:
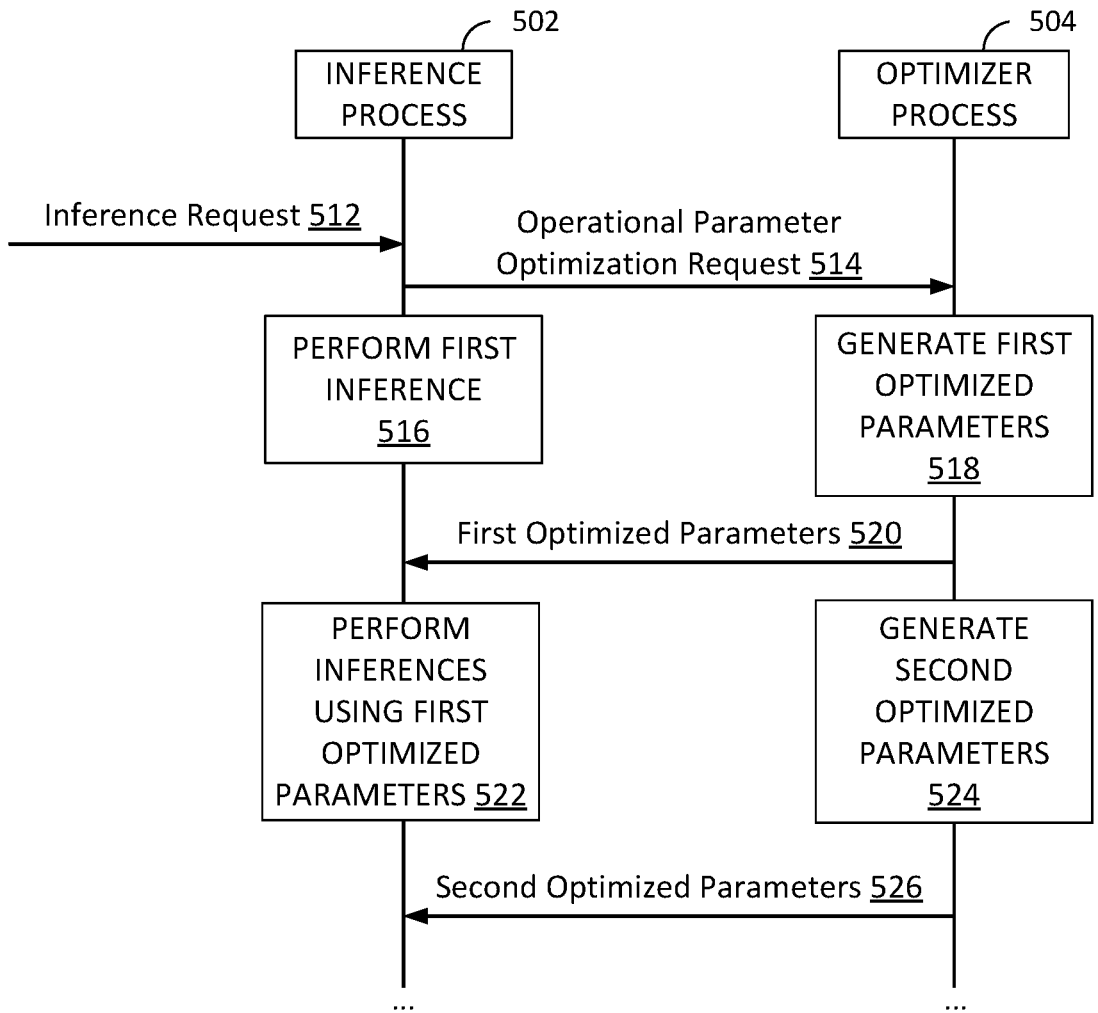
FIG. 5 illustrates example messages exchanged between an inference processor and an operational parameter optimizer to perform concurrent inference and model optimization, according to embodiments described herein.

FIG. 5 illustrates a message flow diagram of messages exchanged during concurrent execution of inference operations and optimization of operational parameters for machine learning models, according to embodiments described herein. As illustrated, an inference process 502 and an optimizer process 504 may execute concurrently or substantially concurrently. As discussed, inference process 502 and optimizer process 504 may execute on different processing cores or hardware resources on the same computing device or may execute on different computing devices.

Concurrent execution of inference operations and optimization of operational parameters for machine learning models generally begins with receipt of an inference request 512 at inference process 502. The inference request 512 may specify a data set against which one or more inferences are to be generated. Inference process 502 may transmit an operational parameter optimization request 514 to optimizer process 504 to initiate operational parameter optimization concurrently with the performance of inferences by inference process 502.

After initiating operational parameter optimization, inference process 502 and optimizer process 502 may execute in parallel. For example, inference process 502 can perform a first inference at 516 while optimizer process 504 generates first optimized parameters at 518. Inference process 502 can perform a first inference at 516 using predefined optimization parameters (e.g., heuristically defined optimized parameters) as a baseline set of operational parameters while optimizer process 504 generates first optimized parameters at 518. By performing an inference using predefined operational parameters, inference process 502 can generate an initial inference within a latency value specifying a maximum amount of time that may elapse between receipt of inference request 512 and the performance of the first inference. Meanwhile, using information about the properties of the machine learning model used by inference process 502 and information about the current operational state of the computing device on which inference process 502 is executing (e.g., current processor speed, thermal limits, current draw, memory latency, cache occupancy, etc.), optimizer process 504 can generate an optimized set of parameters for the machine learning model that results in performance approaching a target set of performance metrics defined for inference operations. The target set of performance metrics may be defined as part of inference request 512 and may define, for example, that an inference should be performed within a specified amount of time, that an inference should be performed using a maximum amount of power, that an inference should result in a given amount of accuracy, and other metrics.

After optimizer process 504 generates first optimized parameters at 518, optimizer process 504 transmits the first optimized parameters 520 to inference process 502. Inference process 502 can then perform future, follow-on inferences using the first optimized parameters at 522. Meanwhile, optimizer process 504 can generate second optimized parameters at 524. The second optimized parameters may be generated through one or more iterations of the optimizer process, taking into account current performance characteristics at the computing device, to attempt to identify a set of optimized parameters that achieve inference performance approaching, meeting, or exceeding target performance metrics. In some embodiments, subsequent generations of operational parameters may achieve inference performance that is closer to the target performance metrics than a previously generated set of operational parameters and may continue until no further refinements can be made to the operational parameters, given the current performance characteristics of the computing device on which inference operations are executed. Optimizer process 504 transmits second optimized parameters 526 to inference process 502, and, as discussed above, inference process 502 can generate inferences using a machine learning model configured using the second optimized parameters.

In some embodiments, optimizer process 504 may run multiple optimization processes sequentially or in parallel to discover optimized parameters for performing inferences using inference process 502. Optimizer process 504 may use recorded performance information provided by inference process 502 for an inference performed using a given set of optimized parameters to determine whether the optimized parameters resulted in increased performance (e.g., performance closer to, meeting, or exceeding the specified target performance metrics) relative to a previous set of optimized parameters. If the recorded performance for an inference using a given set of optimized parameters results in performance that is worse than the recorded performance for an inference using a previous set of optimized parameters or otherwise does not result in increased inference performance, optimizer process 504 can continue searching for optimized parameters for use in performing inferences using the machine learning model. In some embodiments, optimizer process 504 can learn from the recorded performance of inferences performed using generated optimized parameters to identify new experiments that optimizer process 504 can perform to generate optimized parameters. These experiments may have a higher probability of discovering optimized parameters resulting in increased inference performance relative to a previous set of optimized parameters.

Figure 6:
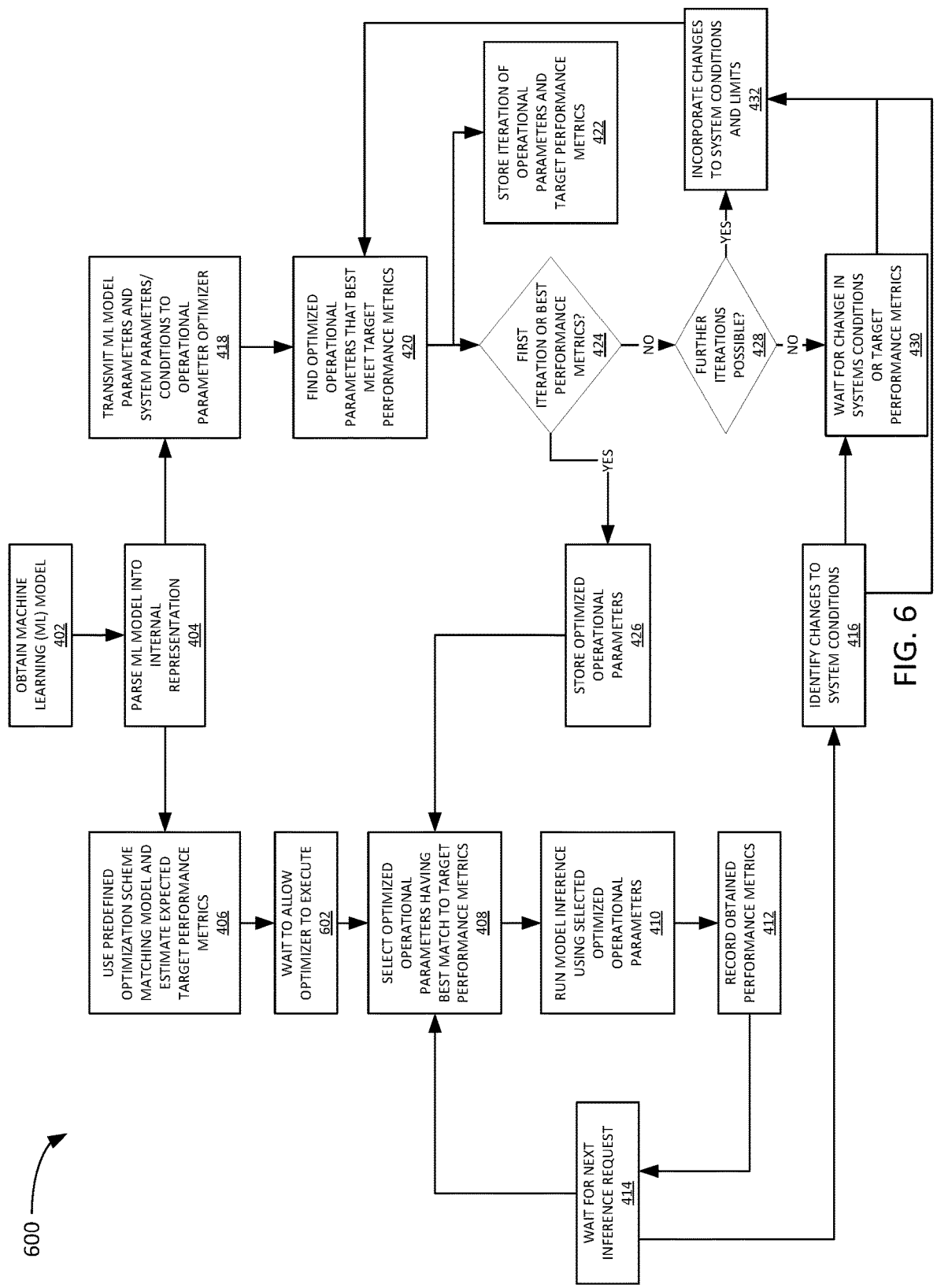
FIG. 6 illustrates a flow chart for concurrent inference and model optimization in which operational parameters generated during an initial optimization are used to perform an initial inference, according to embodiments described herein.

FIG. 6 illustrates a flow chart showing operations performed for concurrent inference and model optimization in which operational parameters generated during an initial optimization are used to perform an initial inference, according to embodiments described herein. The operations illustrated in FIG. 6 may be performed, for example, when an amount of time needed to generate an initial optimization of operational parameters and perform a first inference falls within a latency specified for the generation of an initial inference after receipt of a request to perform inferences on a received data set.

As illustrated, FIG. 6 adds block 602 to the flow chart illustrated in FIG. 4 such that after target performance metrics are estimated using operational parameters generated by a predefined optimization scheme at block 406, an inference process waits to allow an optimizer to execute (e.g., wait for an initial execution through blocks 420-432 to be executed) such that an initial set of optimized operational parameters can be generated for the machine learning model. Once the initial set of optimized operational parameters is generated, an initial inference operation may be performed starting at block 408, where operational parameters having a best match to target performance metrics (e.g., the initial set of optimized operational parameters generated for the machine learning model and the operational characteristics of the computing device on which the machine learning model executes) are selected.

As discussed, operations may proceed to block 410, where inferences are executed using the selected optimized operational parameters, and to block 412, where obtained performance metrics are recorded. At block 414, the system can wait for a subsequent inference request to be received. Meanwhile, during execution of inference processes and while waiting to receive subsequent inference requests, the system can continually optimize operational parameters for the machine learning model until no further optimizations for the model can be made, given the operational characteristics of the computing device on which the machine learning model executes.

Figure 7:
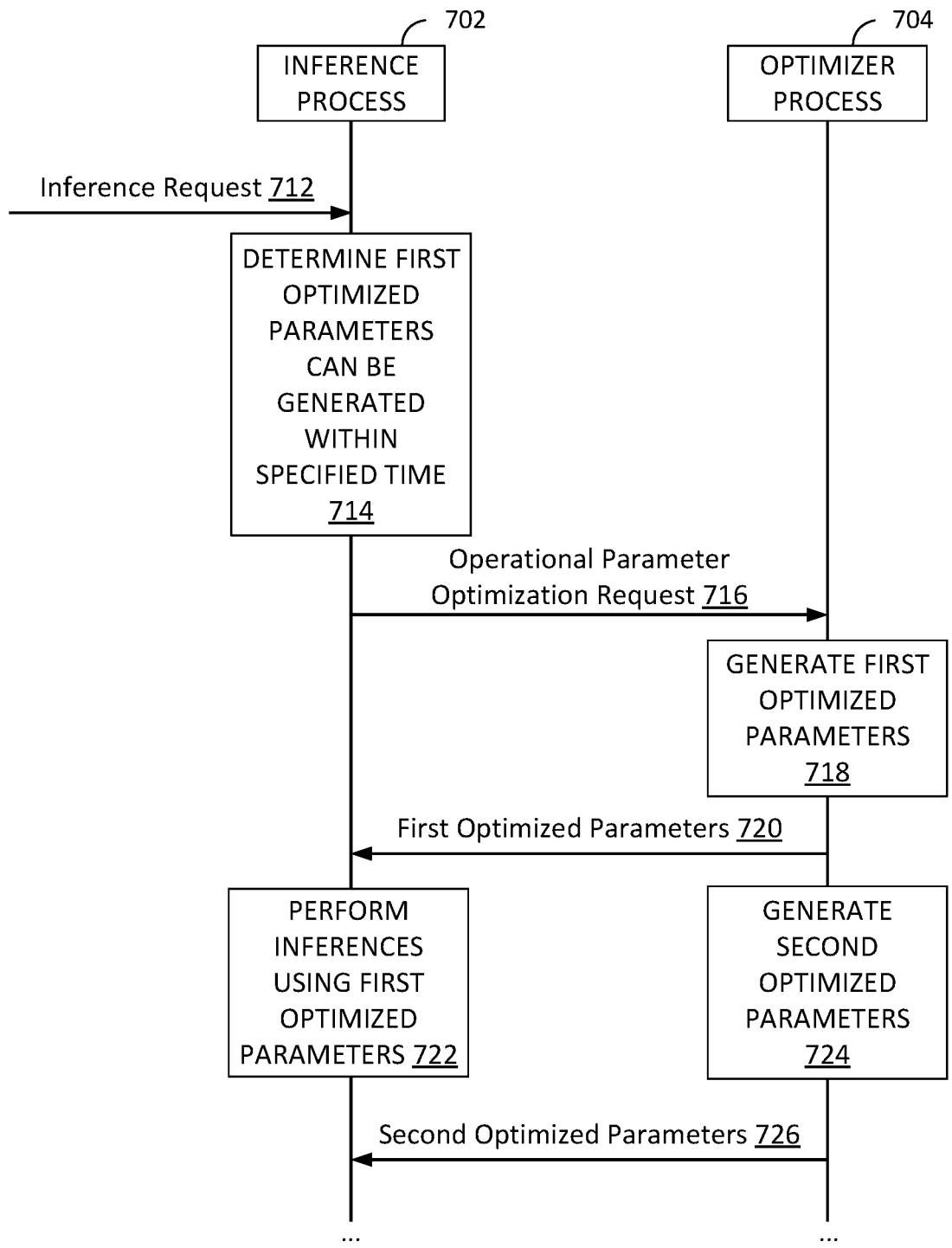
FIG. 7 illustrates example messages exchanged between an inference processor and an operational parameter optimizer to perform concurrent inference and model optimization in which operational parameters generated during an initial optimization are used to perform an initial inference, according to embodiments described herein.

FIG. 7 illustrates a message flow diagram of messages exchanged during execution of inference operations and optimization of operational parameters for machine learning models used during execution of the inference operations in which operational parameters generated during an initial optimization are used to perform an initial inference, according to embodiments described herein.

As illustrated, an inference process 702 may receive an inference request 712. Generally, inference request 712 includes information identifying a data set on which inferences are to be performed and a latency value defining an expected time at which a first inference is to be returned by inference process 702. In response, inference process 702 determines whether first optimized operational parameters can be generated within a specified time at 714. The specified time may be the latency value identified in inference request 712. To determine whether the first optimized operational parameters can be generated within the specified time, inference process 702 can use historical performance information to estimate an amount of time needed for optimization process 704 to generate dynamically optimized parameters for the machine learning model and an expected amount of time needed to generate an inference (e.g., a target execution time performance parameter used as a KPI against which optimized parameters are generated.

If, as illustrated at 714, inference process 702 determines that the first optimized operational parameters can be generated within the specified time, inference process 702 can transmit an operational parameter optimization request 716 to optimizer process 704. Subsequently, optimizer process 704 can generate the first optimized parameters at 718. Optimizer process 704 can generate the first optimized parameters, as discussed above, by mapping properties of the machine learning model and operational characteristics of the computing device on which inference process 702 is executing to operational parameters for the machine learning model using a trained optimizer model. Optimizer process 704 can return the first optimized parameters 720 to inference process 702, which performs inferences using the first optimized parameters at 722.

Meanwhile, optimizer process 704 can further optimize the operational parameters at 724 to generate second operational parameters for the machine learning model that results in performance approaching one or more target performance metrics. The second optimized parameters may be transmitted to inference process 702 via message 726 to execute subsequent inferences using the second optimized parameters, which may result in improved performance relative to inferences performed by executing the machine learning model using the first optimized parameters.

Figure 8:
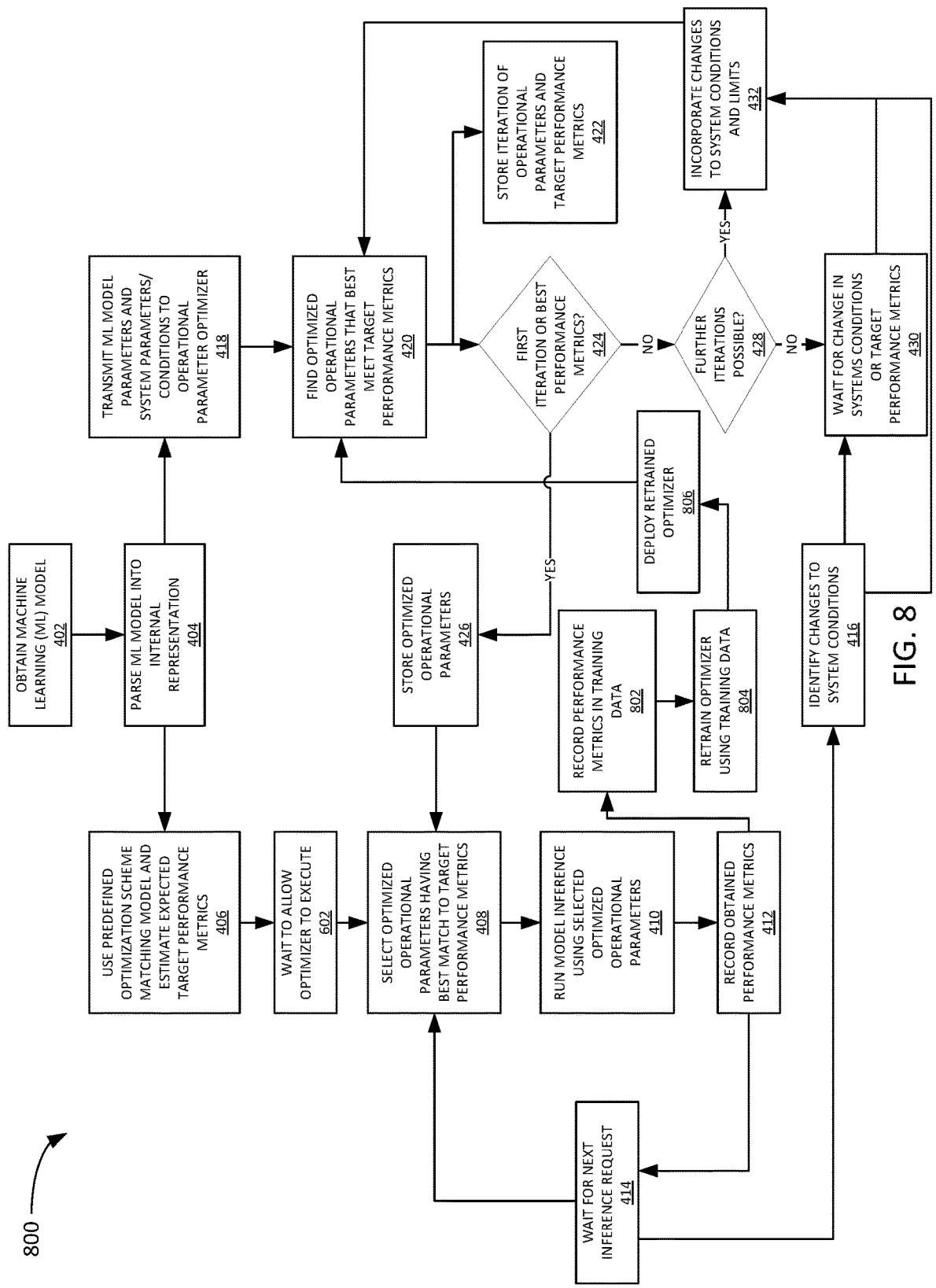
FIG. 8 illustrates a flow chart for concurrent inference and model optimization in which an operational parameter optimizer is periodically retrained based on inference performance results for sets of operational parameters, according to embodiments described herein.

FIG. 8 illustrates a flow chart showing operations performed for concurrent inference and model optimization in which an operational parameter optimizer is periodically retrained based on inference performance results for sets of operational parameters, according to embodiments described herein. The operations illustrated in FIG. 8 may be performed to improve the optimization of parameters for a machine learning model by augmenting a training data set with performance data for sets of optimized parameters and enlarging the data set from which an operational parameter optimizer is trained.

As illustrated, FIG. 8 adds blocks 802-806 to the flow chart illustrated in FIG. 6. After an inference processor runs a model inference using selected optimized operational parameters 410 and records the obtained performance metrics 412, the obtained performance metrics are recorded in a training data set at block 802. At block 804, the optimizer is retrained using the training data. Generally, because retraining the optimizer may be a computationally expensive process, the optimizer may be retrained periodically (e.g., after a number of inferences have been performed, after a time has elapsed since the most recent retraining, etc.). After the optimizer is retrained, at block 806, the system deploys the retrained optimizer to an optimizer process.

Figure 9:
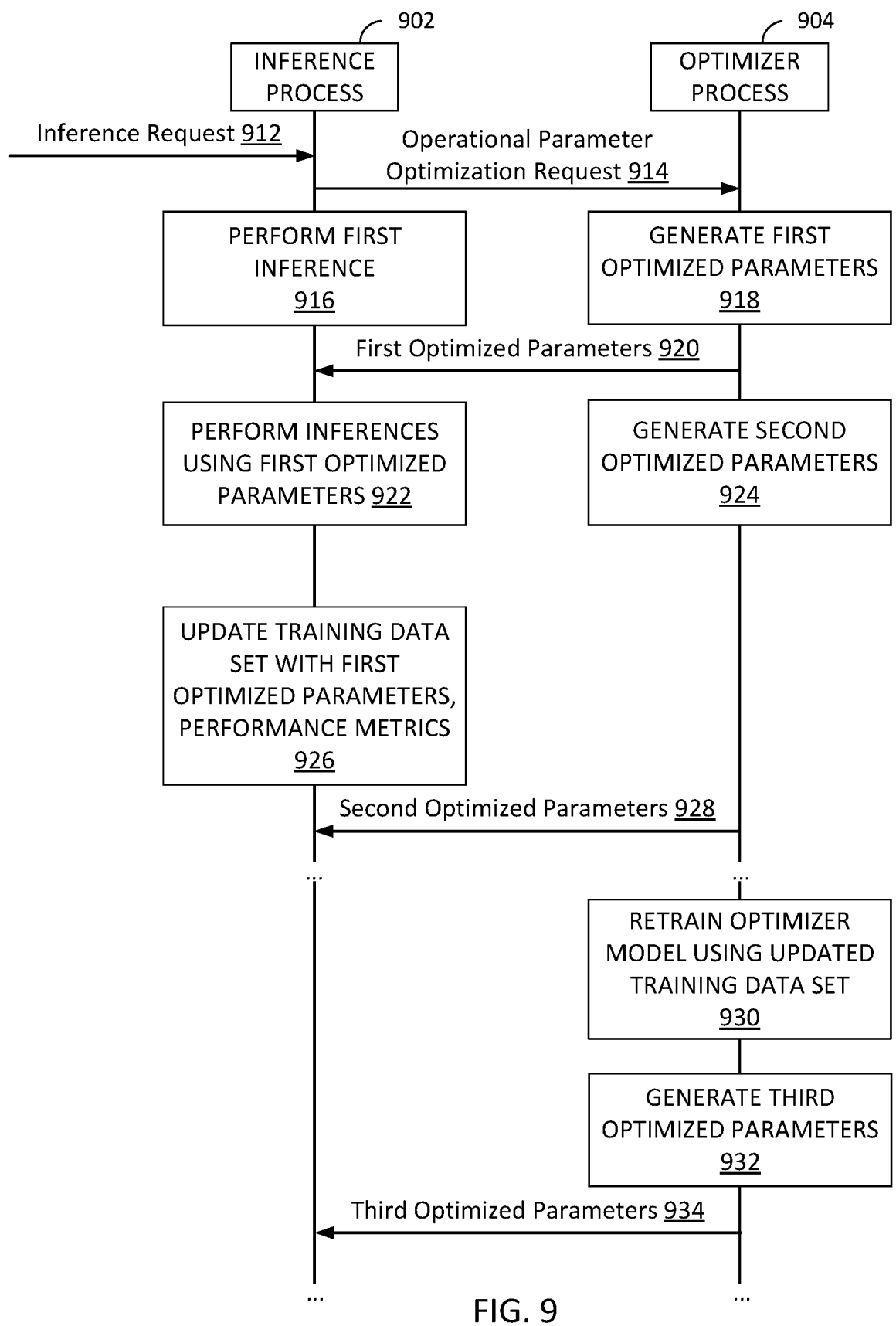
FIG. 9 illustrates example messages exchanged between an inference processor and an operational parameter optimizer to perform concurrent inference and model optimization in which an operational parameter optimizer is periodically retrained based on inference performance results for sets of operational parameters, according to embodiments described herein.

FIG. 9 illustrates a message flow diagram of messages exchanged during execution of inference operations and optimization of operational parameters for machine learning models used during execution if the inference operations in which an operational parameter optimizer is periodically retrained based on inference performance results for sets of operational parameters, according to embodiments described herein.

As illustrated, an inference process 902 may receive an inference request 912, and the inference process 902 may transmit operational parameter optimization request 914 to initiate execution of optimizer process 904 substantially simultaneously with execution of inference process 902. Inference process 902 may also perform a first inference using a predefined set of optimized parameters at 916, and concurrently or substantially concurrently, optimizer process 904 may generate first optimized parameters at 918. The first optimized parameters may be transmitted, via message 920, to inference process 902, and inference process 902 can perform one or more inferences using the first optimized parameters 922. At 926, inference process 902 can update a training data set with the first optimized parameters and performance metrics. Concurrently, optimizer process 904 can generate second optimized parameters at 924 and provide the second optimized parameters to inference process 902 via message 928. Generally, as inference process 902 performs additional inferences from received data sets, performance data associated with the optimized parameters used for each inference may be added to the updated training data set.

At some later time, optimizer process 904 retrains an optimizer model using the updated training data set at 930. Generally, retraining the optimizer model may entail generating a new machine learning model or updating an existing machine learning model (e.g., changing weights of parameters in a machine learning model used for optimizing operational parameters for models used to perform inferences on received data sets) based on a training data set of data including properties of a machine learning model, operational characteristics of a computing device on which the machine learning model executes, parameters applied to the machine learning model, and performance metrics measured during execution of the machine learning model using the applied parameters. As discussed, retaining the optimizer model may allow for additional data to be considered in identifying optimized parameters for execution of a machine learning model on a computing device.

Based on the retrained optimizer model, at 932, optimizer process generates third optimized parameters for execution of the machine learning model. The third optimized parameters may be provided to inference process 902 via message 934, and inference process 902 may perform inferences and update a training data set with the third optimized parameters and performance metrics, as discussed above. Periodically, optimizer process 904 may retrain the optimizer model to learn from new optimizations and the resulting performance metrics associated with each inference performed using the new optimizations.

Example Processing Systems for Optimizing Machine Learning Model Performance

Figure 10:
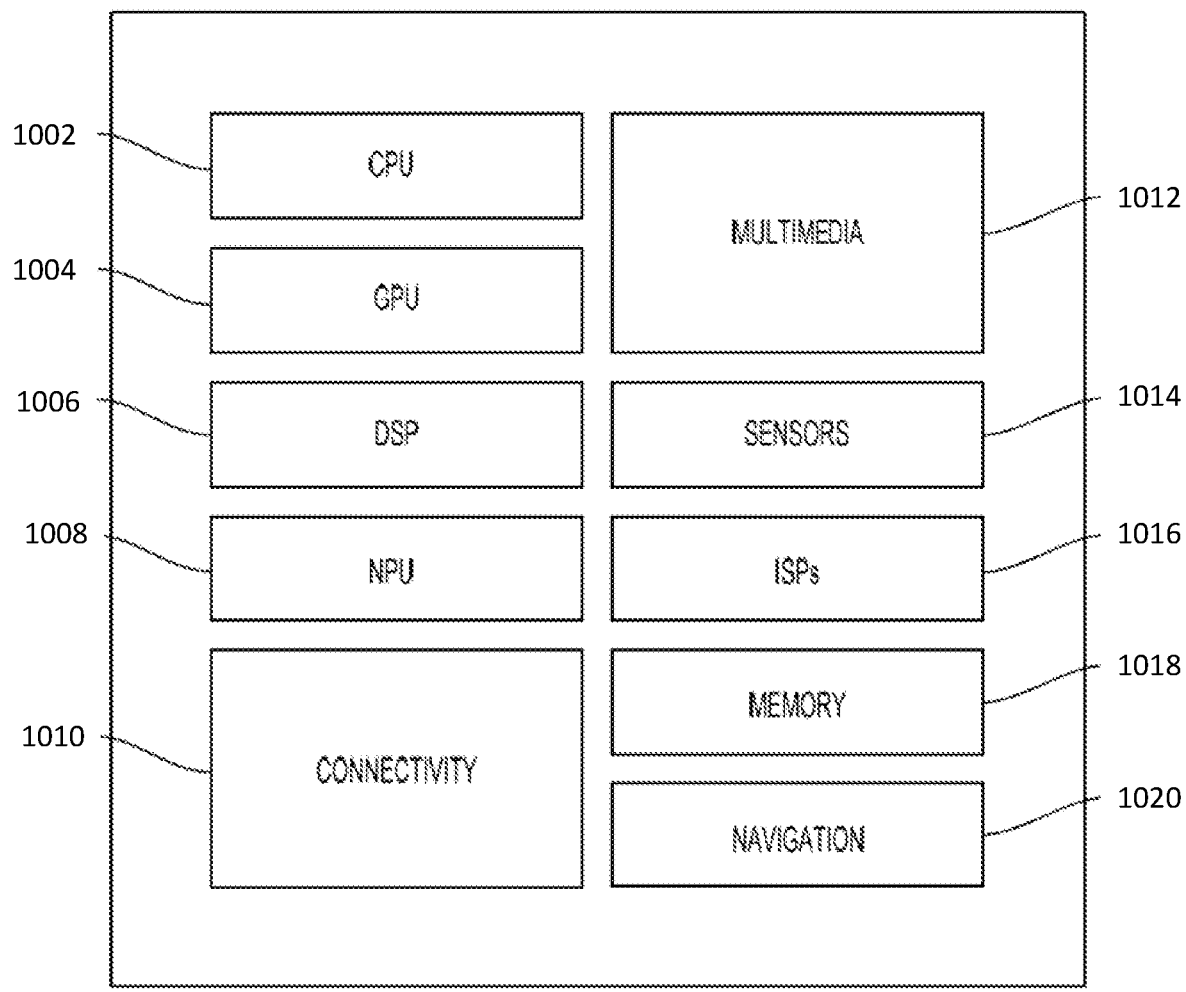
FIG. 10 illustrates an example implementation of a system-on-a-chip (SOC).

FIG. 10 illustrates an example implementation of a system-on-a-chip (SOC) 1000, which may include a central processing unit (CPU) 1002 or a multi-core CPU configured to concurrently perform inferences using a machine learning model and optimization of operating parameters for the machine learning model, according to embodiments described herein. Variables (e.g., neural signals and synaptic weights), system parameters associated with a computational device (e.g., neural network with weights), delays, frequency bin information, and task information may be stored in a memory block associated with a neural processing unit (NPU) 1008, in a memory block associated with a CPU 1002, in a memory block associated with a graphics processing unit (GPU) 1004, in a memory block associated with a digital signal processor (DSP) 1006, in a memory block 1018, or may be distributed across multiple blocks. Instructions executed at the CPU 1002 may be loaded from a program memory associated with the CPU 1002 or may be loaded from a memory block 1018.

The SOC 1000 may also include additional processing blocks tailored to specific functions, such as a GPU 1004, a DSP 1006, a connectivity block 1010, which may include fifth generation (5G) connectivity, fourth generation long term evolution (4G LTE) connectivity, Wi-Fi connectivity, USB connectivity, Bluetooth connectivity, and the like, and a multimedia processor 1012 that may, for example, detect and recognize gestures. In one implementation, the NPU is implemented in the CPU 1002, DSP 1006, and/or GPU 1004. The SOC 1000 may also include a sensor processor 1014, image signal processors (ISPs) 1016, and/or navigation module 1020, which may include a global positioning system.

The SOC 1000 may be based on an ARM instruction set. In an aspect of the present disclosure, the instructions loaded into the CPU 1002 may comprise code to perform inferences using a machine learning model and concurrently optimize operational parameters for the machine learning model.

SOC 1000 and/or components thereof may be configured to perform the methods described herein.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing inferences using a machine learning model on a computing device, comprising:
   receiving a request to perform inferences on a data set using a machine learning model configured to perform the inferences and performance metric targets for performance of the inferences;
   performing a first inference on the data set using the machine learning model to meet a latency specified for generation of the first inference from receipt of the request, wherein the first inference is performed using baseline operational parameters configured for execution of inference operations using the machine learning model, wherein the baseline operational parameters comprise predefined parameters for the machine learning model;
   while performing the first inference using the machine learning model, identifying operational parameters using an operational parameter optimizer model configured to identify the operational parameters resulting in inference performance approaching, meeting, or exceeding the performance metric targets based on the machine learning model and operational properties of a computing device; and
   applying the identified operational parameters to performance of subsequent inferences using the machine learning model.

2. The method of claim 1, wherein the operational parameters comprise parameters associated with hardware parameters or hardware conditions at the computing device.

3. The method of claim 1, wherein the baseline operational parameters are identified by:
   generating a representation of the machine learning model; and
   searching a repository for operational parameters associated with the representation of the machine learning model and the operational properties of the computing device.

4. The method of claim 1, wherein performing the at least the first inference on the data set comprises:
   estimating a total amount of time to identify the baseline operational parameters resulting in inference performance approaching, meeting, or exceeding the performance metric targets and generate the first inference on the data set using the baseline operational parameters;
   determining that the estimated total amount of time is within the latency specified for generation of the first inference from receipt of the request; and performing the first inference on the data set by applying the baseline operational parameters to execution of the machine learning model.

5. The method of claim 1, wherein identifying operational parameters resulting in inference performance approaching the performance metric targets based on the machine learning model and operational properties of the computing device comprises:
generating a plurality of sets of operational parameters, each set being associated with a different performance metric; and
selecting one of the plurality of sets of operational parameters having a performance metric closest to the performance metric targets.

6. The method of claim 1, further comprising:
detecting a change in the operational properties of the computing device;
updating the operational parameters based on the machine learning model and the changed operational properties of the computing device; and
applying the updated operational parameters to performance of additional inferences using the machine learning model.

7. The method of claim 6, wherein detecting the change in the operational properties of the computing device comprises determining that a difference between previous operational properties of the computing device and current operational properties of the computing device exceeds a threshold amount of change.

8. The method of claim 1, wherein identifying operational parameters resulting in inference performance approaching the performance metric targets based on the machine learning model and operational properties of the computing device comprises inputting information about the machine learning model and the operational properties of the computing device into the operational parameter optimizer model trained using a training data set of performance data from previous inferences and performance metrics for the previous inferences.

9. The method of claim 8, further comprising: for each inference performed on the computing device, augmenting the training data set with performance data for each inference and operational parameters applied to the machine learning model for each inference.

10. The method of claim 9, further comprising: periodically retraining the operational parameter optimizer model using the augmented training data set.

11. The method of claim 8, further comprising: periodically updating the operational parameter optimizer model based on updates received from a remote system.

12. The method of claim 1, wherein identifying operational parameters resulting in inference performance approaching the performance metric targets based on the machine learning model and operational properties of the computing device comprises:
transmitting, to the operational parameter optimizer model executing on a remote system, information about the machine learning model and the operational properties of the computing device; and
receiving the operational parameters from the operational parameter optimizer model executing on the remote system.

13. A system, comprising:
one or more processors; and
a memory having instructions stored thereon which, when executed by the one or more processors configured individually or in any combination, performs an operation for performing inferences using a machine learning model on a computing device, the operation comprising:
receiving a request to perform inferences on a data set using a machine learning model configured to perform the inferences and performance metric targets for performance of the inferences;
performing a first inference on the data set using the machine learning model to meet a latency specified for generation of the first inference from receipt of the request, wherein the first inference is performed using baseline operational parameters configured for execution of inference operations using the machine learning model, wherein the baseline operational parameters comprise predefined parameters for the machine learning model;
while performing the first inference using the machine learning model, identifying operational parameters using an operational parameter optimizer model configured to identify the operational parameters resulting in inference performance approaching, meeting, or exceeding the performance metric targets based on the machine learning model and operational properties of a computing device; and
applying the identified operational parameters to performance of subsequent inferences using the machine learning model.

14. The system of claim 13, wherein performing the at least the first inference on the data set comprises:
estimating a total amount of time to identify the baseline operational parameters resulting in inference performance approaching, meeting, or exceeding the performance metric targets and generate the first inference on the data set using the baseline operational parameters;
determining that the estimated total amount of time is within the latency specified for generation of the first inference from receipt of the request; and
performing the first inference on the data set by applying the baseline operational parameters to execution of the machine learning model.

15. The system of claim 13, wherein identifying operational parameters resulting in inference performance approaching the performance metric targets based on the machine learning model and operational properties of the computing device comprises:
generating a plurality of sets of operational parameters, each set being associated with a different performance metric; and
selecting one of the plurality of sets of operational parameters having a performance metric closest to the performance metric targets.

16. The system of claim 13, wherein the operation further comprises:
detecting a change in the operational properties of the computing device;
updating the operational parameters based on the machine learning model and the changed operational properties of the computing device; and
applying the updated operational parameters to performance of additional inferences using the machine learning model.

17. The system of claim 13, wherein identifying operational parameters resulting in inference performance approaching the performance metric targets based on the machine learning model and operational properties of the computing device comprises inputting information about the machine learning model and the operational properties of the computing device into the operational parameter optimizer model trained using a training data set of performance data from previous inferences and performance metrics for the previous inferences.

18. The system of claim 17, wherein the operation further comprises:
   for each inference performed on the computing device, augmenting the training data set with performance data for each inference and operational parameters applied to the machine learning model for each inference; and
   periodically retraining the operational parameter optimizer model using the augmented training data set.

19. The system of claim 13, wherein identifying operational parameters resulting in inference performance approaching the performance metric targets based on the machine learning model and operational properties of the computing device comprises:
   transmitting, to the operational parameter optimizer model executing on a remote system, information about the machine learning model and the operational properties of the computing device; and
   receiving the operational parameters from the operational parameter optimizer model executing on the remote system.

20. A non-transitory computer-readable medium having instructions stored thereon which, when executed by one or more processors configured individually or in any combination, performs an operation for performing inferences using a machine learning model on a computing device, the operation comprising:
   receiving a request to perform inferences on a data set using a machine learning model configured to perform the inferences and performance metric targets for performance of the inferences;
   performing a first inference on the data set using the machine learning model to meet a latency specified for generation of the first inference from receipt of the request, wherein the first inference is performed using baseline operational parameters configured for execution of inference operations using the machine learning model, wherein the baseline operational parameters comprise predefined parameters for the machine learning model;
   while performing the first inference using the machine learning model, identifying operational parameters using an operational parameter optimizer model configured to identify the operational parameters resulting in inference performance approaching, meeting, or exceeding the performance metric targets based on the machine learning model and operational properties of a computing device; and
   applying the identified operational parameters to performance of subsequent inferences using the machine learning model.

* * * * *